(12) United States Patent
Kountanya et al.

(10) Patent No.: US 9,914,170 B2
(45) Date of Patent: Mar. 13, 2018

(54) METHOD FOR MAKING AN INTEGRALLY BLADED ROTOR WITH HOLLOW BLADES

(71) Applicant: Hamilton Sundstrand Corporation, Windsor Locks, CT (US)

(72) Inventors: Raja Kountanya, Vernon, CT (US); Michael A. Klecka, Vernon, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 798 days.

(21) Appl. No.: 14/303,673

(22) Filed: Jun. 13, 2014

(65) Prior Publication Data
US 2015/0360292 A1    Dec. 17, 2015

(51) Int. Cl.
| | | |
|---|---|---|
| B22F 5/04 | (2006.01) | |
| B22F 3/105 | (2006.01) | |
| F01D 5/34 | (2006.01) | |
| B23K 26/342 | (2014.01) | |
| B23K 26/211 | (2014.01) | |
| B23K 101/00 | (2006.01) | |

(52) U.S. Cl.
CPC .............. *B22F 5/04* (2013.01); *B22F 3/1055* (2013.01); *B23K 26/211* (2015.10); *B23K 26/342* (2015.10); *B23K 2201/001* (2013.01); *F01D 5/34* (2013.01); *Y02P 10/295* (2015.11)

(58) Field of Classification Search
CPC ........ B22F 3/008; B22F 3/1055; B22F 5/009; B22F 5/04; B22F 5/10; B22F 5/106; B22F 2003/1056; B22F 2003/1057; B22F 2003/1058; B22F 2003/1059; B22F 2005/004; B22F 2005/005; B22F 2005/103; B23K 2201/001; B29C 67/0051; B29C 67/0074; B29C 67/0077; B29C 67/0081; B29C 67/04
See application file for complete search history.

(56) References Cited

U.S. PATENT DOCUMENTS

| | | | |
|---|---|---|---|
| 5,113,583 A | | 5/1992 | Jenkel et al. |
| 5,511,949 A | | 4/1996 | Thore |
| 6,154,959 A | * | 12/2000 | Goodwater ............. B23P 6/002 228/119 |
| 7,020,539 B1 | * | 3/2006 | Kovacevic ............ B22F 3/1055 483/16 |

(Continued)

OTHER PUBLICATIONS

"Properties of Metal Powders for Additive Manufacturing", retrieved on Aug. 11, 2014, URL: http://dx.doi.org/10.6028/NIST.IR.7873. 22 Pages (Jul. 2010).

(Continued)

*Primary Examiner* — Scott Kastler
*Assistant Examiner* — Vanessa T Luk
(74) *Attorney, Agent, or Firm* — Cantor Colburn LLP

(57) ABSTRACT

A method of making an integrally bladed rotor with hollow blades. A plurality of segmented layers are sequentially placed to form each one of a plurality of blades on a radially outward surface of a hub. This is done using an additive manufacturing process. The placement of the segmented layers also comprises omitting portions of one or more of the plurality of segmented layers to form one or more cavities and intermittently removing a quantity of particles from the one or more cavities using an evacuation tool.

12 Claims, 3 Drawing Sheets

(56) References Cited

U.S. PATENT DOCUMENTS

| | | | |
|---|---|---|---|
| 7,695,248 B2* | 4/2010 | Mons | B23K 26/147 |
| | | | 219/121.64 |
| 7,993,105 B2 | 8/2011 | Weisse et al. | |
| 8,667,775 B1 | 3/2014 | Kisska et al. | |
| 2007/0134096 A1 | 6/2007 | Mons et al. | |
| 2008/0178994 A1* | 7/2008 | Qi | B22F 3/1055 |
| | | | 156/245 |
| 2010/0239427 A1* | 9/2010 | Strother | B21D 26/021 |
| | | | 416/229 A |
| 2011/0033331 A1* | 2/2011 | Tuppen | B22F 3/093 |
| | | | 419/8 |
| 2013/0280082 A1 | 10/2013 | Propheter-Hinckley et al. | |
| 2015/0224607 A1 | 8/2015 | Bruck et al. | |

OTHER PUBLICATIONS

European Search Report for EP15171624.8 dated Dec. 4, 2015.

\* cited by examiner

METHOD FOR MAKING AN INTEGRALLY BLADED ROTOR WITH HOLLOW BLADES

BACKGROUND

The present disclosure relates generally to bladed rotor manufacturing and, more particularly, to a method for manufacturing an integrally bladed rotor with hollow blades.

Integrally bladed rotors (IBRs), such as impellers, blisks, etc., employed in turbines and other machines are components of complex geometry. The design, construction and materials of IBRs often dictate operating limits for the turbines in which they are employed. Extensive efforts have been made over the years to develop new alloys, new fabrication techniques, and new component designs which permit operation of these rotors at higher operating temperatures and/or lead to lighter weight, longer lived components, with all their attendant advantages.

In order to reduce weight, the fan blades in some gas turbine engines are hollow. Each fan blade is made by combining two separate detail halves. Each half includes a plurality of cavities and ribs machined out to reduce the weight while forming a structurally sound internal configuration. One half forms the pressure side wall and the other half forms the suction side wall. When the detail halves are joined, the pressure side wall and the suction side wall are separated and supported by the ribs to form the hollow fan blade. The hollow fan blade is then subjected to forming operations at extremely high temperatures at which time it is given an airfoil shape and geometry. The side walls are contoured and curved to form the airfoil. The blades are then fixed to the hub or another element by laser welding or another joining technique.

Manufacturing a hollow-bladed IBR without subtractive manufacturing methods such as machining is currently not possible. While use of additive manufacturing in the formation of solid bladed IBR is trivial, there is currently no additive manufacturing method that would enable the precision formation of a hollow space in the center of a perfectly balanced blade, directly on the hub. Furthermore, thermal stresses generated in the bulky structure of massive components causes deformations of the individual layers formed during the manufacturing process. In the case of large massive components the deformation caused by thermal stress during melting and subsequent solidification of one layer of powder material can be so extensive as to negatively affect or even hindering the deposition of the subsequent powder layer, as the lower solidified and deformed layer obstructs the movement of the rack used to distribute the subsequent powder layer. Accordingly, the industry is receptive to new concepts that overcome these problems and which would enable production of an IBR with hollow blades.

SUMMARY

Disclosed herein is a method of making a integrally bladed rotor comprising a hub and a plurality of hollow blades. Each of plurality of hollow blades is formed by using an additive manufacturing process to integrally form a plurality of segmented layers successively outward from a radially outward surface of a hub. While forming the plurality of hollow blades, one or more cavities is formed in the plurality of hollow blades. The one or more cavities are formed by omitting a portion of one or more of the plurality of segmented layers and periodically evacuating a quantity of excess material from the one or more cavities.

Also disclosed herein is a method of making an integrally bladed rotor with hollow blades. A plurality of segmented layers are sequentially placed to form each one of a plurality of blades on a radially outward surface of a hub. This is done using an additive manufacturing process. The placement of the segmented layers also comprises omitting portions of one or more of the plurality of segmented layers to form one or more cavities and intermittently removing a quantity of particles from the one or more cavities using an evacuation tool. A relief hole is formed in at least one of the one or more cavities. The cavity is then evacuated via the relief hole, after which the relief hole is filled.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. It is to be understood that other embodiments may be utilized and changes may be made without departing from the scope of the present disclosure. In particular, the disclosure provides various examples related to hollow blades of an impeller for a turbine engine, whereas the advantages of the present disclosure as applied in a related field would be apparent to one having ordinary skill in the art and are considered to be within the scope of the present invention.

Figure 1A:
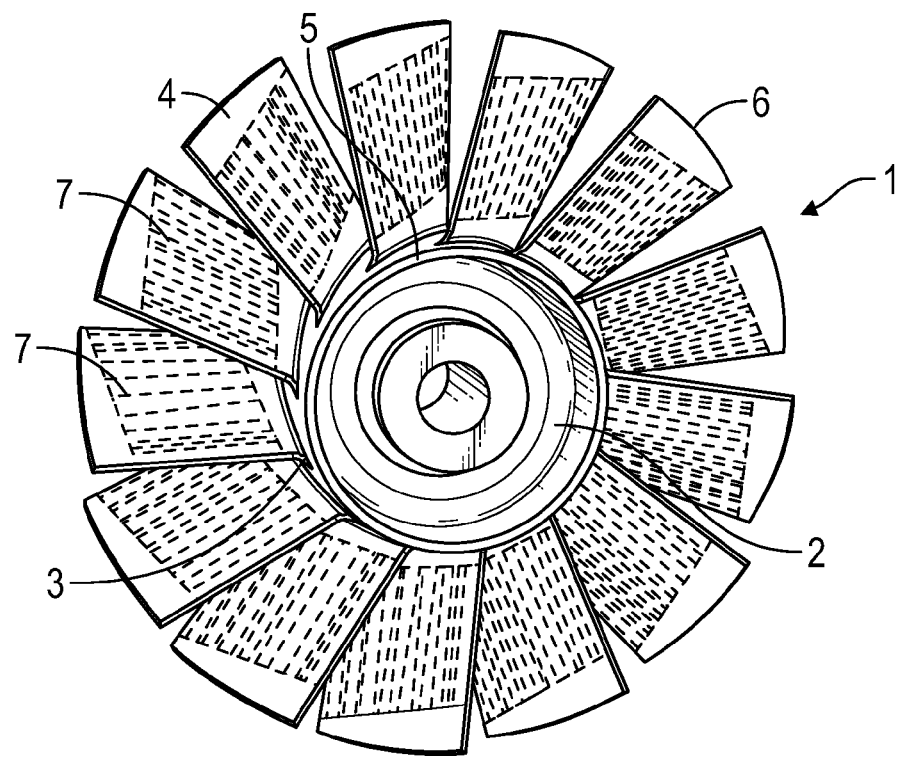
FIG. 1A is a plan view of an integrally bladed rotor with hollow blades according to one embodiment.
Figure 1B:
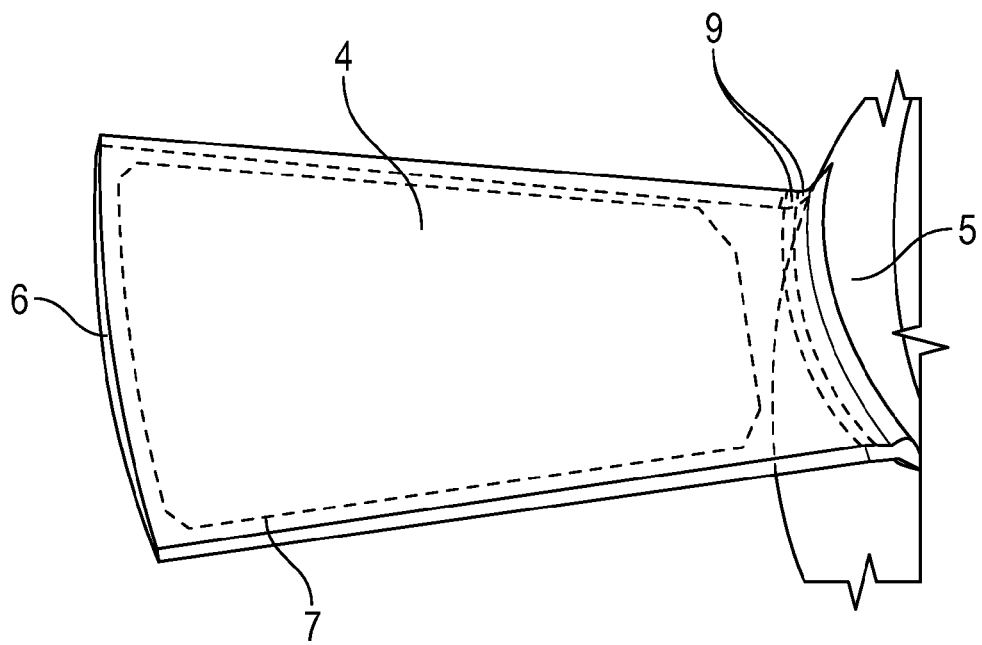
FIG. 1B is a plan view of one blade of the integrally bladed rotor with hollow blades depicted in FIG. 1A.

The present disclosure provides a method of making an integrally bladed rotor (IBR) with hollow blades. FIGS. 1A and 1B illustrate a hollow-bladed IBR 1 formed according to the present disclosure. The IBR may be, for example, an impeller for an aircraft engine or any other rotor with blades. The IBR includes a hub 2 (or disk) having one or more radially outward surfaces 3. The rotor hub 2 may be machined from titanium stock or another appropriate material.

A plurality of blades 4 are evenly distributed around the hub 2. Each of the blades 4 comprises a base portion 5 disposed on one of the radially outward surfaces 3 and a tip 6 formed at a distal end of each blade with respect to the hub 2. One or more of the plurality of blades 4 contains one or more cavities 7. Each of the cavities 7 may extend from the base portion 5 to the tip 6. Alternatively, the cavities 7 may be formed having different lengths. As may be appreciated, the arrangement and size of the cavities 7 within each blade 4 is chosen to achieve the desired balance of the individual blade 4 and/or the IBR 1. The IBR 1 illustrated in FIGS. 1A and 1B offers a weight reduction, compared to a similar solid model, of approximately 20%. Other designs may achieve a weight savings of as much as approximately 40% or more.

The IBR 1 of the present disclosure is formed using hybrid manufacturing technology, which involves the cooperative use of both additive and subtractive manufacturing elements. As discussed above, there are no currently available solutions that provide an IBR with hollow blades through the use of additive manufacturing processes alone. The use of subtractive manufacturing during the additive manufacturing process enables the formation of precision shapes. In some examples, the present disclosure provides the use of hybrid manufacturing technology where additive and subtractive manufacturing are accomplished using the same machine, reducing the amount of time required to accomplish the precision manufacturing discussed herein. Such machines are currently available, for example from SAUER GmbH, which provides machines that perform laser metal deposition and five-axis CNC milling in the same location.

The present disclosure provides specific solutions to unique problems encountered while implementing hybrid manufacturing processes to form an IBR with hollow blades. For example, in order to achieve a perfectly balanced IBR 1 using additive manufacturing, it is necessary to persistently remove or sufficiently minimize the amount of powder (e.g., raw material for the additive process) and chips (i.e., excess material removed during the subtractive process) that are deposited in the cavities 7 as they are formed. Currently available hybrid manufacturing techniques do not provide such a removal step. In some examples, the loose particles must be removed throughout the manufacturing process in order to prevent the particles from being sintered into an inner wall of the cavity 7. The excess particles that become trapped in the one or more cavities 7, whether loose or attached to a wall, affect the balance of the IBR. A wind curtain or evacuation tool can be employed to accomplish the periodic removal of particles from the cavity 7.

The amount of powder that becomes trapped in the cavities 7 can be reduced by controlling the properties of the raw material used in the additive process for consistency of purity and shape. For example, a quantity of raw material that contains individual particles that vary greatly in morphological characteristics, such as flatness, elongation, roundness, etc., or which contain other materials entrained in the quantity, will be difficult to apply consistently resulting in material losses and the potential for powder left in the cavities 7. The amount of material that becomes trapped in the cavities 7 can also be reduced by using a wind curtain or other tool.

In some embodiments, the raw material may be controlled to maintain chemical purity, or at least 99.0% purity. In other examples, the properties of the powder are controlled to have optimal morphological characteristics for the material and the chosen additive manufacturing technique. For example, the raw material can be controlled in terms of flatness, elongation, roundness, and/or any other morphological characteristics and/or size in order to provide an optimal quantity of raw material that will reduce the amount of unsintered powder left on the product. In some examples, the raw material was controlled to have a particle size and density within 10% of a target particle size, or within 20% of a target particle size. Methods for measuring the purity of the particles in a quantity are well known.

In some embodiments, the particle size may be controlled to be no larger than about 10 µm, or about 50 µm. In some examples, the particles were also controlled to remove irregular shapes. The size and shape of the particles may be controlled, for example, by sorting the particles through a chute splitter, a spin riffler, or other sorting device.

Figure 2:
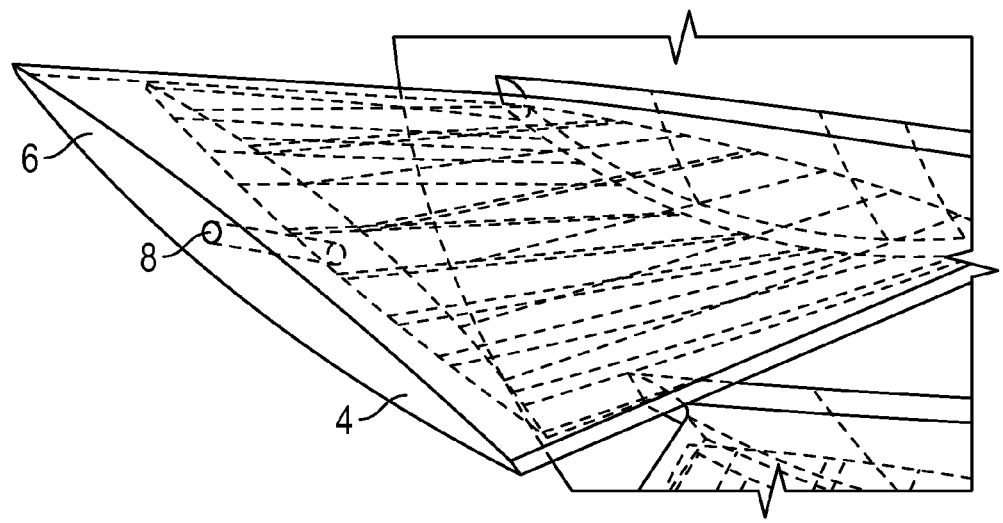
FIG. 2 is a plan view of a hollow blade of an integrally bladed rotor according to another embodiment.

Referring to FIG. 2, the blades 4 may be formed with a relief hole 8 for one or more of the cavities 7 at the tip 6 or another location. This allows a vacuum process or other process to be used to remove additional particles near completion of the IBR 1. The relief hole 8 can then be filled to match the surrounding area, (i.e., plugged), using an additive process.

The additive manufacturing process used in the present disclosure is not limited and may be, for example, a laser deposition, ultrasonic additive manufacturing (UAM), cold spray, electron beam deposition, another additive process, or a combination thereof. Depending on the process chosen, the temperature should be controlled to avoid any undue residual stresses in the blades as they are formed.

Figure 3:
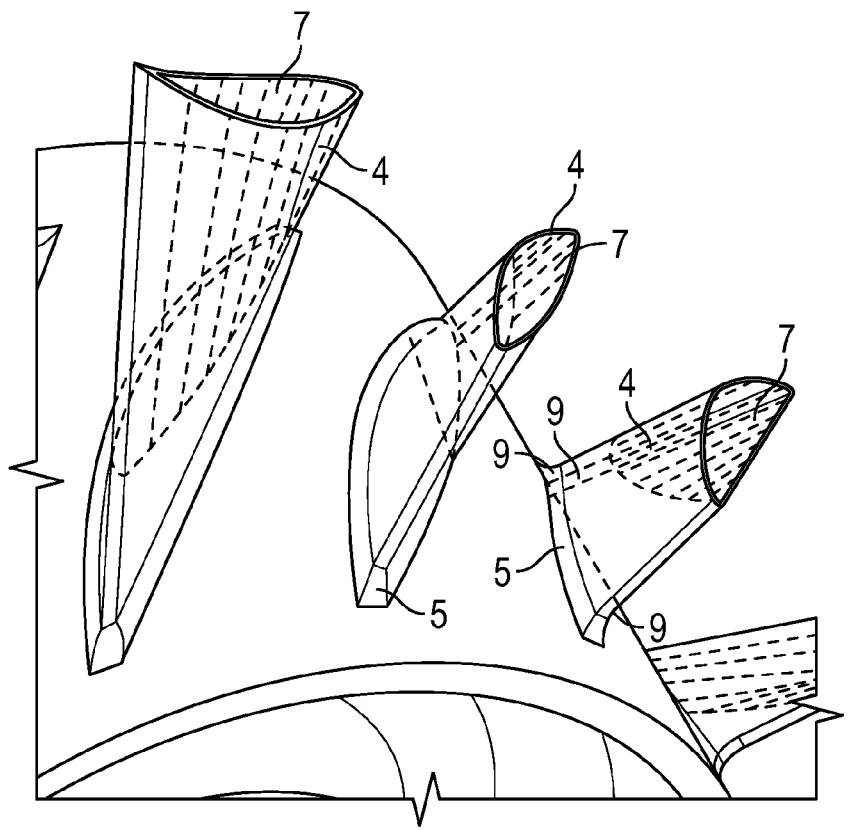
FIG. 3 is a side view of a portion of an integrally bladed rotor according to another embodiment.

FIG. 3 illustrates a blade 4 of the IBR 1 segmented into a plurality layers 9. In some embodiments, the layers 9 are segmented radially outward from the hub 2. Each of the plurality of blades 4 is segmented into layers 9, for example, using computer aided drawing (CAD) software program that can interface with the machinery performing the additive manufacturing process, as will be appreciated by those in the art. Each layer 9 is deposited on the radially outward surface 3 as a quantity of raw material. For example, the quantity of raw material may be irradiated as it is arranged on the radially outward surface 3 to sequentially form the segmented layers 9, and is thereby thermally welded or otherwise sintered or bonded to the radially outward surface 3. Each of the segmented layers 9 are added successively outward by depositing a quantity of raw material in place and irradiating, (or otherwise solidifying), that material to sinter the material into an integral piece with the previous layer, with the layer 9 forming the base portion 5 being formed directly onto the radially outward surface 3. One or more of the layers 9 may be further shaped to match the intended design using a subtractive manufacturing process, e.g., machining or milling. Each layer 9 is essentially welded or otherwise bonded to the previous layer to form the blade 4 as an integral piece with the hub 2.

Figure 4:
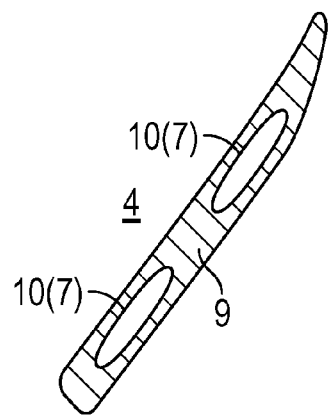
FIG. 4 is a top view of one layer of a blade according to another embodiment.

Referring now to FIG. 4, the cavities 7 are formed with as each layer 9 is deposited. This is done, for example, by omitting the material deposited by additive process from one or more portions 10 of a plurality of the segmented layers 9. The formation of the cavities 7 may be aided by the use of a subtractive process. Excess material can be evacuated in quantities intermittently between individual layers, between several layers, or as needed. The evacuation of the excess material can be performed by employing a wind curtain or some other evacuation tool. In addition, individual layers or groups of layers may be machined as the blade 4 is built, as necessary to achieve the desired shape of the blade 4 and of the cavities 7.

As discussed above, a relief hole 8 may be formed for one or more of the cavities 7. The nearly enclosed cavity 7 is then evacuated to remove any remaining excess material. Finally, the relief hole 8 is filled. The cavity 7 may be filled with a fluid prior to filling the relief hole 8. Alternatively, the cavity 7 may retain a portion of the excess material, e.g., powder, or may have a quantity of powder or another loose material inserted into the cavity 7 prior to filling the relief hole 8. The presence of a quantity of powder or other loose particles within the cavity 7 may serve as a vibrational damper, as discussed in commonly-owned US Publication No. 2013/0280082, incorporated by reference herein.

Finally, the blades 4 of the IBR 1 can be machined to achieve the desired surface characteristics for the intended application. For example, where the IBR 1 is an impeller of a turbine engine, the surface characteristics can change the behavior of the fluid passing through the impeller, negatively impacting the performance. The additional finishing may be necessary where the additive manufacturing process results in an unsatisfactory surface.

Figure 5A:
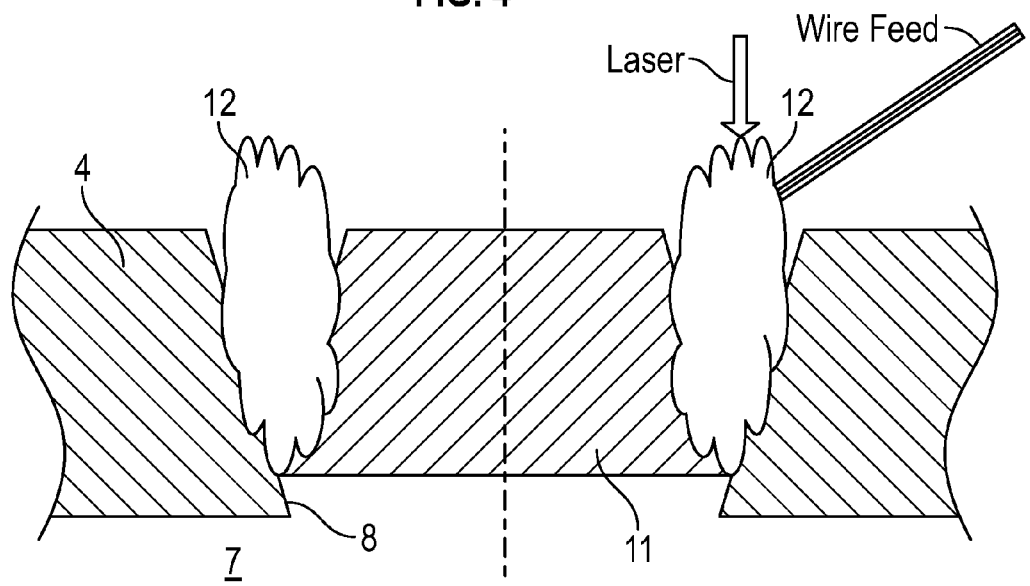
FIGS. 5A and 5B are sectioned side views depicting a process for filling a relief hole in one blade of the integrally bladed rotor, according to another embodiment.
Figure 5B:
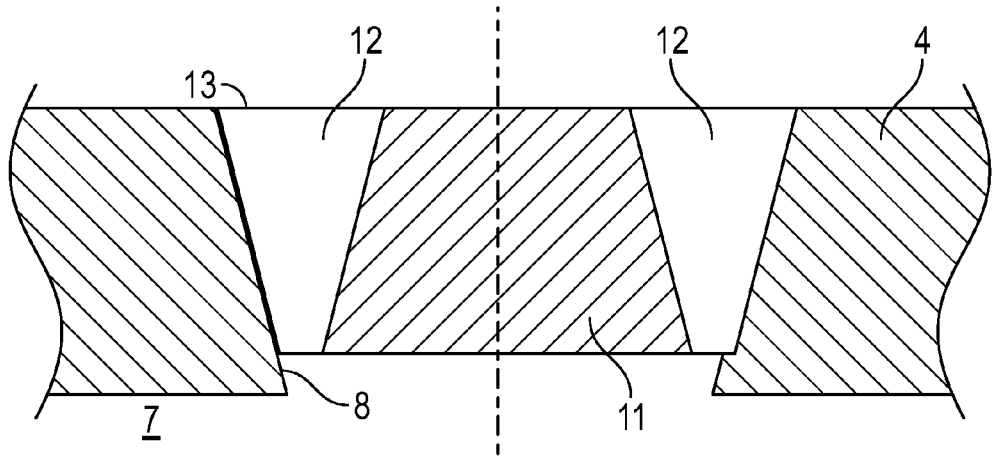

In one embodiment, the relief hole 8 is filled with a plug 11. FIGS. 5A and 5B illustrate various stages of such a process. After the cavity 7 has been evacuated or otherwise cleared of excess material, a plug 11 is placed in the relief hole 8. A filler material 12 may be provided at the periphery of the plug 11. The filler material may be an epoxy-based material or other adhesive, or may be an additive manufacturing material such as a wire feed for a laser deposition process, a soldering material, or the like. The plug 11 may be configured in any shape that fills the relief hole 8, and/or which may accommodate for any filler material 12 to complete the IBR. After completing this process, as shown in FIG. 5B, the outer surface 13 of the blade 4 should conform to a selected aerodynamic profile. In other embodiments, the plug 11 and the filler material 12 may be arranged to conform to a selected profile for the shape of the cavity 7.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method of making an integrally bladed rotor comprising a hub and a plurality of hollow blades, the method comprising:
    forming each of a plurality of hollow blades by using an additive manufacturing process to integrally form a plurality of segmented layers successively outward from a radially outward surface of a hub;
    while forming the plurality of hollow blades, forming one or more cavities in one or more of the plurality of hollow blades by omitting a portion of one or more of the plurality of segmented layers and periodically evacuating a quantity of excess material from the one or more cavities;
    forming a relief hole for each of the one or more cavities at a tip of each of the plurality of hollow blades;
    evacuating each of the one of the one or more cavities via the relief hole; and
    plugging the relief hole.

2. The method of claim 1, wherein plugging the relief hole comprises:
    arranging a plug in the relief hole;
    disposing a filler material along a periphery of the plug; and
    solidifying the filler material to secure the plug in the relief hole, the plug and the filler material forming an outer surface that conforms to a selected profile.

3. The method of claim 1, further comprising using a subtractive manufacturing process to shape one or more of the segmented layers.

4. The method of claim 1, wherein integrally forming the plurality of segmented layers comprises supplying a quantity of a raw material irradiating the raw material to form the segmented layer.

5. The method of claim 4, wherein the raw material is controlled to have a particle size of less than about 50 microns.

6. The method of claim 4, wherein the raw material is about 99% pure.

7. The method of claim 1, wherein removing the quantity of excess material is performed using a wind curtain or other evacuation tool.

8. A method of making an integrally bladed rotor with hollow blades, the method comprising:
    sequentially forming a plurality of segmented layers to form each one of a plurality of blades on a radially outward surface of a hub using an additive manufacturing process, forming the plurality of segmented layers further comprising:
    omitting portions of one or more of the plurality of segmented layers to form one or more cavities;
    intermittently removing a quantity of particles from the one or more cavities using an evacuation tool;
    forming a relief hole at a tip of each one of a plurality of blades for at least one of the one or more cavities;
    evacuating the at least one of the one or more cavities via the relief hole; and
    filling the relief hole.

9. The method of claim 8, wherein sequentially forming one of the plurality of segmented layers comprises supplying a quantity of a raw material irradiating the raw material to form the segmented layer.

10. The method of claim 8, wherein sequentially forming the plurality of segmented layers further comprises periodically machining the segmented layers.

11. The method of claim 8, wherein filling the relief hole comprises:
    arranging a plug in the relief hole; and
    disposing a filler material along a periphery of the plug.

12. The method of claim 11, wherein filling the relief hole further comprises solidifying the filler material to secure the plug in the relief hole, the plug and the filler material forming an outer surface that conforms to a selected profile.

* * * * *